US011556710B2

(12) United States Patent
Dreher et al.

(10) Patent No.: US 11,556,710 B2
(45) Date of Patent: Jan. 17, 2023

(54) PROCESSING ENTITY GROUPS TO GENERATE ANALYTICS

(71) Applicant: International Business Machines Corporation, Armonk, NY (US)

(72) Inventors: Brian S. Dreher, San Jose, CA (US); Sheng Hua Bao, San Jose, CA (US); Xiaoyang Gao, San Jose, CA (US); Yanyan Han, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 15/977,374

(22) Filed: May 11, 2018

(65) Prior Publication Data
US 2019/0347324 A1    Nov. 14, 2019

(51) Int. Cl.
*G06F 40/295* (2020.01)
*G06N 20/00* (2019.01)
*G06F 16/28* (2019.01)

(52) U.S. Cl.
CPC .......... *G06F 40/295* (2020.01); *G06F 16/288* (2019.01); *G06N 20/00* (2019.01)

(58) Field of Classification Search
CPC ...... G06F 40/295; G06F 16/288; G06N 20/00
See application file for complete search history.

(56) References Cited

U.S. PATENT DOCUMENTS

| 7,984,043 B1* | 7/2011 | Waas | G06F 16/8358 |
| | | | 707/718 |
| 8,364,692 B1* | 1/2013 | Allen | G06F 16/90344 |
| | | | 707/758 |
| 8,887,156 B2 | 11/2014 | Chambers et al. | |
| 9,390,131 B1* | 7/2016 | Fuller | G06F 16/2365 |
| 2003/0028509 A1* | 2/2003 | Sah | G06F 16/284 |
| 2004/0078251 A1* | 4/2004 | DeMarcken | G06Q 10/02 |
| | | | 705/5 |
| 2007/0016574 A1* | 1/2007 | Carmel | G06F 16/951 |
| | | | 707/999.005 |
| 2007/0179927 A1 | 8/2007 | Vaidyanathan et al. | |
| 2008/0059460 A1* | 3/2008 | Lunenfeld | G06F 16/951 |
| | | | 707/999.005 |
| 2008/0313202 A1* | 12/2008 | Kamen | G06F 16/36 |
| 2009/0089630 A1* | 4/2009 | Goldenberg | G06F 16/2462 |
| | | | 714/704 |
| 2015/0052098 A1* | 2/2015 | Kveton | G06N 20/00 |
| | | | 706/52 |

(Continued)

OTHER PUBLICATIONS

Hadley Wickham, The Split-Apply-Combine Strategy for Data Analysis, Journal of Statistical Software, Apr. 2011, vol. 40, Issue 1., Rice University, 29 pages.

*Primary Examiner* — Matthew J Ellis
(74) *Attorney, Agent, or Firm* — Edell, Shapiro & Finnan, LLC

(57) ABSTRACT

A computer system processes a group of inputs. A group of entities that is input for processing is intercepted. The intercepted group is expanded into individual entities. Each of the individual entities is processed to produce results for each individual entity. The results for each individual entity are intercepted and merged to produce results for the group of entities. Embodiments of the present invention further include a method and program product for processing a group of inputs in substantially the same manner described above.

15 Claims, 4 Drawing Sheets

(56) References Cited

U.S. PATENT DOCUMENTS

| | | | |
|---|---|---|---|
| 2017/0039246 A1* | 2/2017 | Bastide | G06Q 10/10 |
| 2017/0076221 A1* | 3/2017 | Boinodiris | G06N 5/022 |
| 2018/0181625 A1* | 6/2018 | Lyons | G06F 16/951 |
| 2018/0349467 A1* | 12/2018 | Malhotra | G06F 16/2228 |
| 2019/0121894 A1* | 4/2019 | Scott | H04L 9/0618 |
| 2019/0294724 A1* | 9/2019 | Michelis | G06F 16/2471 |

* cited by examiner

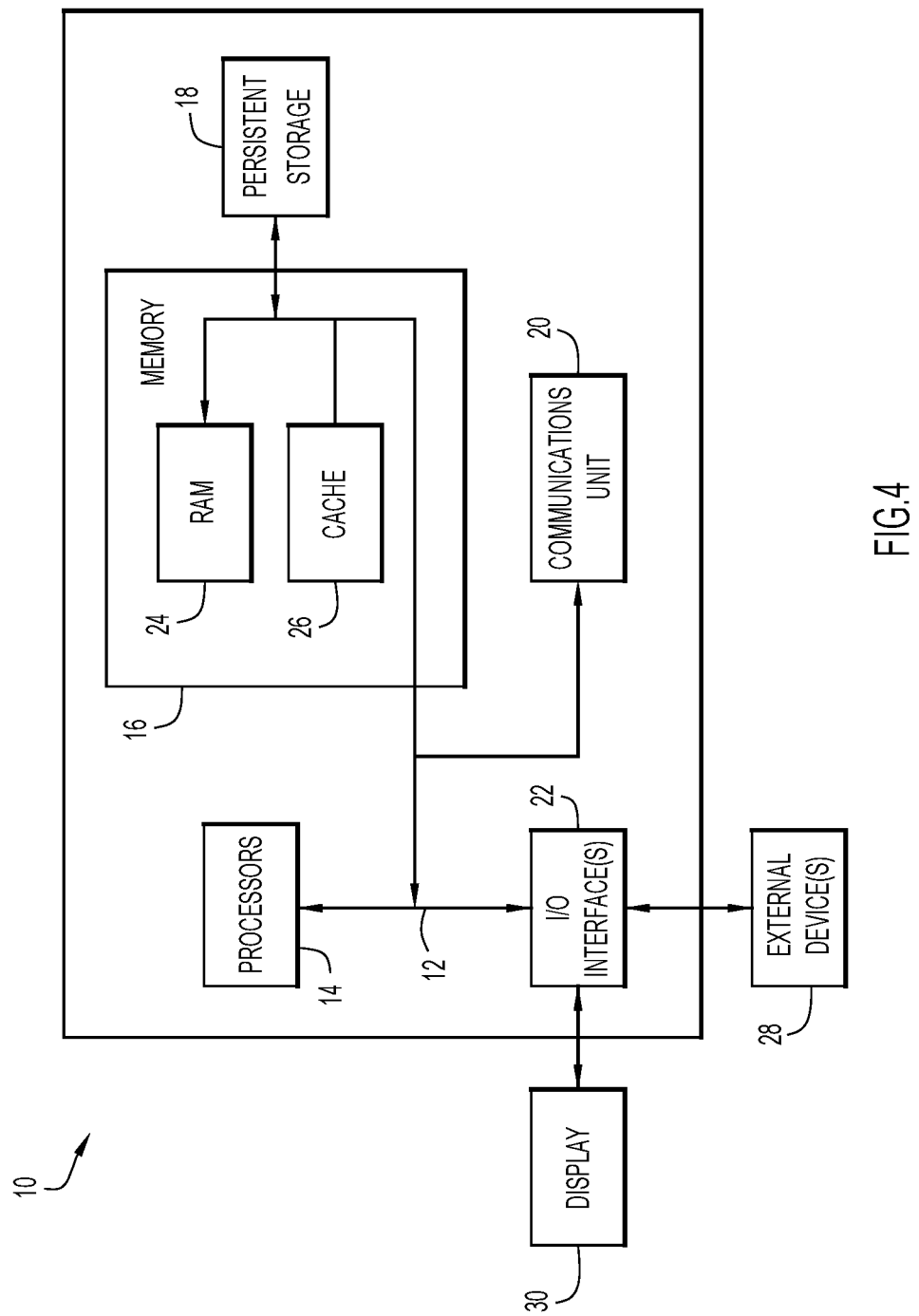

PROCESSING ENTITY GROUPS TO GENERATE ANALYTICS

BACKGROUND

1. Technical Field

Present invention embodiments relate generally to processing entity groups to generate analytics, and more specifically, to expanding entity groups into individual entities and processing each entity individually.

2. Discussion of the Related Art

Analytics refers to the discovery, interpretation, and communication of meaningful patterns in data. In order to generate analytics, data may be processed from industries that generate large amounts of data, such as medical research and financial markets. When data is first processed (or "ingested"), an analytics engine may apply various techniques, such as data mining and machine learning. One particular technique is named-entity recognition, in which named entities, such as persons, locations, organizations, and products, are located in text and classified into pre-defined categories. However, data ingestion can be quite time-consuming, particularly when there are many named entities to be processed.

SUMMARY

According to one embodiment of the present invention, a computer system processes a group of inputs. A group of entities that is input for processing is intercepted. The intercepted group is expanded into individual entities. Each of the individual entities is processed to produce results for each individual entity. The results for each individual entity are intercepted and merged to produce results for the group of entities. Embodiments of the present invention further include a method and program product for processing a group of inputs in substantially the same manner described above.

BRIEF DESCRIPTION OF THE DRAWINGS

Generally, like reference numerals in the various figures are utilized to designate like components.

FIG. 4 is a block diagram depicting a computing device in accordance with an embodiment of the present invention.

DETAILED DESCRIPTION

Figure 1:
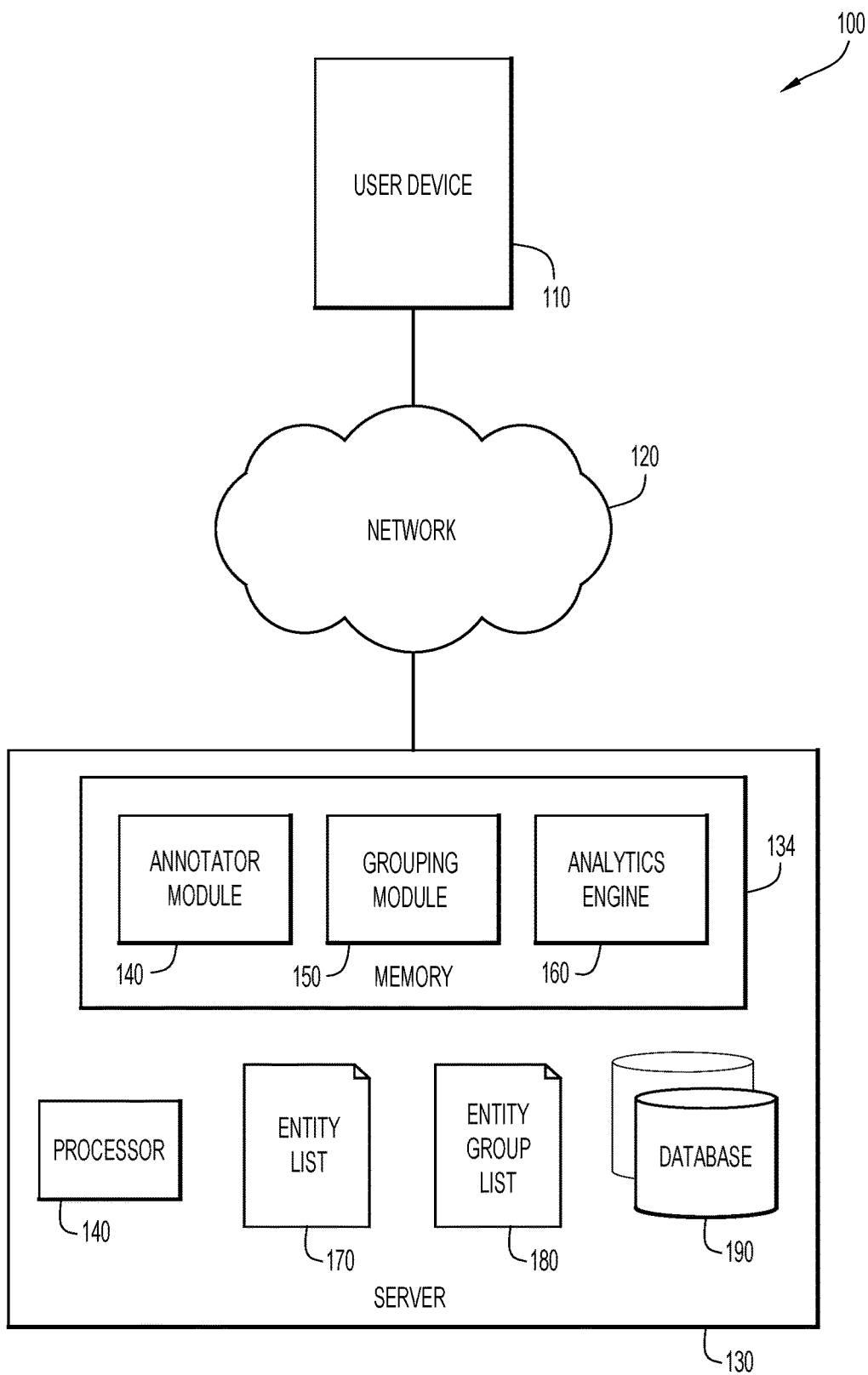
FIG. 1 is a block diagram depicting a computing environment for processing entity groups in accordance with an embodiment of the present invention.

Present invention embodiments relate generally to processing entity groups to generate analytics, and more specifically, to expanding entity groups into individual entities and processing each entity individually. A named entity can be any object or concept that can be denoted with a proper name, such as a particular person, location, vehicle, chemical, medicine, illness, gene, etc. Entities may also be grouped together into entity groups. While entities refer to specific people, places, and things, entity groups may refer to multiple entities that share characteristics. For example, "New York City," "Chicago," and "Los Angeles" may be entities, whereas "cities in the United States" is an entity group that includes all three aforementioned cities.

When text data is ingested by an analytics engine, a document is annotated to indicate where entities are present in the document. For example, a list of entities relating to chemistry research may contain several hundred entities that correspond to chemical compounds; when data is ingested according to this entity list, the data will be annotated to indicate where the listed chemical compounds appear in the data. Later, when analytics are performed on the data, the analytics engine will be able to determine the portions of the data that contain chemistry-related entities.

When data analytics are performed on previously-ingested data, one or more entities or entity groups may be included as input parameters. If an entity is included as an input parameter (e.g. in a request to perform data analytics), and the dataset was not annotated for that entity during the ingestion phase, the dataset will require re-ingestion in order to annotate the document with the new entity. Since the ingestion phase is costly in terms of time and computing resource consumption, such re-ingestion and annotation should be avoided.

Although a document may have been annotated for individual entities, the document may not have been annotated for entity groups. For example, a document could be annotated for entities like "hypertension" and "atrial fibrillation," but not annotated for the entity group "cardiovascular disease." Present invention embodiments avoid re-ingesting and annotating data for entity groups by intercepting requests that contain entity groups and expanding the entity groups into individual entities (for which the data has been annotated). By expanding entity groups into entities and processing each entity individually, present invention embodiments reduce the amount of processing time and computing resources used for performing analytics on data.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for processing entity groups in accordance with an embodiment of the present invention. As depicted, computing environment 100 includes a user device 110, a network 120, and a server 130. A user may provide requests that include one or more entities to server 130 via user device 110. In some embodiments, user device 110 is a front-end device and server 130 is a back-end system. It is to be understood that the functional division among components of computing environment 100 have been chosen for purposes of explaining present invention embodiments, and is not to be construed as a limiting example.

User device 110 may include a laptop computer, a tablet computer, a netbook computer, a personal computer (PC), a desktop computer, a personal digital assistant (PDA), a smart phone, a thin client, or any programmable electronic device capable of executing computer readable program instructions. User device 110 may include internal and external hardware components, as depicted and described in further detail with respect to FIG. 4.

Network 120 may include a local area network (LAN), a wide area network (WAN) such as the Internet, or a combination of the two, and includes wired, wireless, or fiber optic connections. In general, network 120 can include any combination of connections and protocols that will support communications between user device 110 and server 130 in accordance with embodiments of the present invention.

Server 130 may include an annotator module 140, a grouping module 150, an analytics engine 160, an entity list 170, an entity group list 180, and a database 190. In general, server 130 ingests data to make the data available for various analytics tasks by annotating the data with entities from an entity list. When a processing request includes an entity group, server 130 converts the group into individual entities, and processes each entity individually against the ingested data to produce analytics. At least one processor, such as processor 132, executes the instructions of the modules stored in memory 134.

Annotator module 140 may annotate data during ingestion by searching the data for the appearance of entities and annotating the data accordingly. For example, annotator module 140 may produce a list of the annotations pointing to locations in which entities appear in data. Data can be stored in any desired format or structure, so an annotation may indicate a particular document, page, column, row, line, or any other form of describing a location in the data in which an entity appears. Annotator module 140 may store annotated data in a database such as database 190.

Grouping module 150 may intercept entity groups when they are received by server 130 and expand the entity groups into individual entities. When a user sends a request to perform analytics on data, one or more entities and/or entity groups may be included in the request. Grouping module 150 may detect an entity group in a request and expand the entity group into individual entities. For example, if an entity group is "cardiovascular disease," then grouping module 150 may expand the entity group into several entities, such as "angina," "myocardial infarction," "cardiomyopathy," and the like. Grouping module 150 may determine which entities belong to an entity group by consulting entity group list 180. After analytics have been performed against the annotated data with each of the individual entities, grouping module 150 may intercept the results of analytics engine 160 before the results are sent to the requester (e.g., a user of user device 110). Grouping module 150 may combine the individual intercepted results into a merged entity group results, which server 130 returns to the requester.

When a request is intercepted, grouping module 150 may distinguish whether an input element is an entity or an entity group according to the input element's classification. An input element can be classified as either an entity or entity group. Furthermore, if an input element is an entity rather than an entity group, it may be classified as a particular entity type. For example, input elements could be classified as "group," "chemical," "disease," "gene," and the like.

In other embodiments, grouping module 150 may determine whether an input element is an entity or an entity group according to the input element's presence on either entity list 170 or entity group list 180. For example, if "entity1" is listed on entity group list 180 and/or is not listed on entity list 170, then grouping module 150 may determine that entity1 is an entity group.

In some embodiments, grouping module 150 may assign entities to an entity group using machine learning techniques. Grouping module 150 may employ various models to perform the learning (e.g., neural networks, mathematical/statistical models, classifiers, etc.). Grouping module 150 may be trained using supervised or unsupervised learning. When grouping module 150 determines a relationship between an entity and an entity group, grouping module 150 may add that relationship to entity group list 180.

Analytics engine 160 may receive individual entities from grouping module 150 and process each entity individually against ingested data to generate analytics for each entity. Analytics engine 160 may produce analytics according to conventional or other data analytics generation techniques. For example, if an entity group is expanded into five entities, analytics engine 160 may look for known relationships between two or more of the entities by analyzing the distance between the entities as they appear in ingested data. Analytics engine 160 may process each entity of an entity group in parallel or serially. In some embodiments, server 130 has multiple analytics engines that each specialize in processing particular entity types; depending on an entity's entity type, it is processed by the appropriate analytics engine. Once analytics engine 160 processes all of the individual entities, the results of processing may be returned.

Entity list 170 may include a list of entities that annotator module 140 references during the data ingestion phase. Server 130 may have a single entity list 170, or multiple entity lists organized according to entity types. For example, there may be a separate entity list for chemicals, medications, diseases, genes, etc. Entity group list 180 may include a list of entity groups and the entities that are a member of each group.

Database 190 may include any non-volatile storage media known in the art. For example, database 190 can be implemented with flash memory, a tape library, optical library, one or more independent hard disk drives, or multiple hard disk drives in a redundant array of independent disks (RAID). Similarly, data on database 190 may conform to any suitable storage architecture known in the art, such as a file, a relational database, an object-oriented database, and/or one or more tables. Data stored on database 190 may include any data before or after it is ingested and annotated, as well as any analytics data produced by analytics engine 160. Database 190 may also store entity list 170 and entity group list 180.

Figure 2:
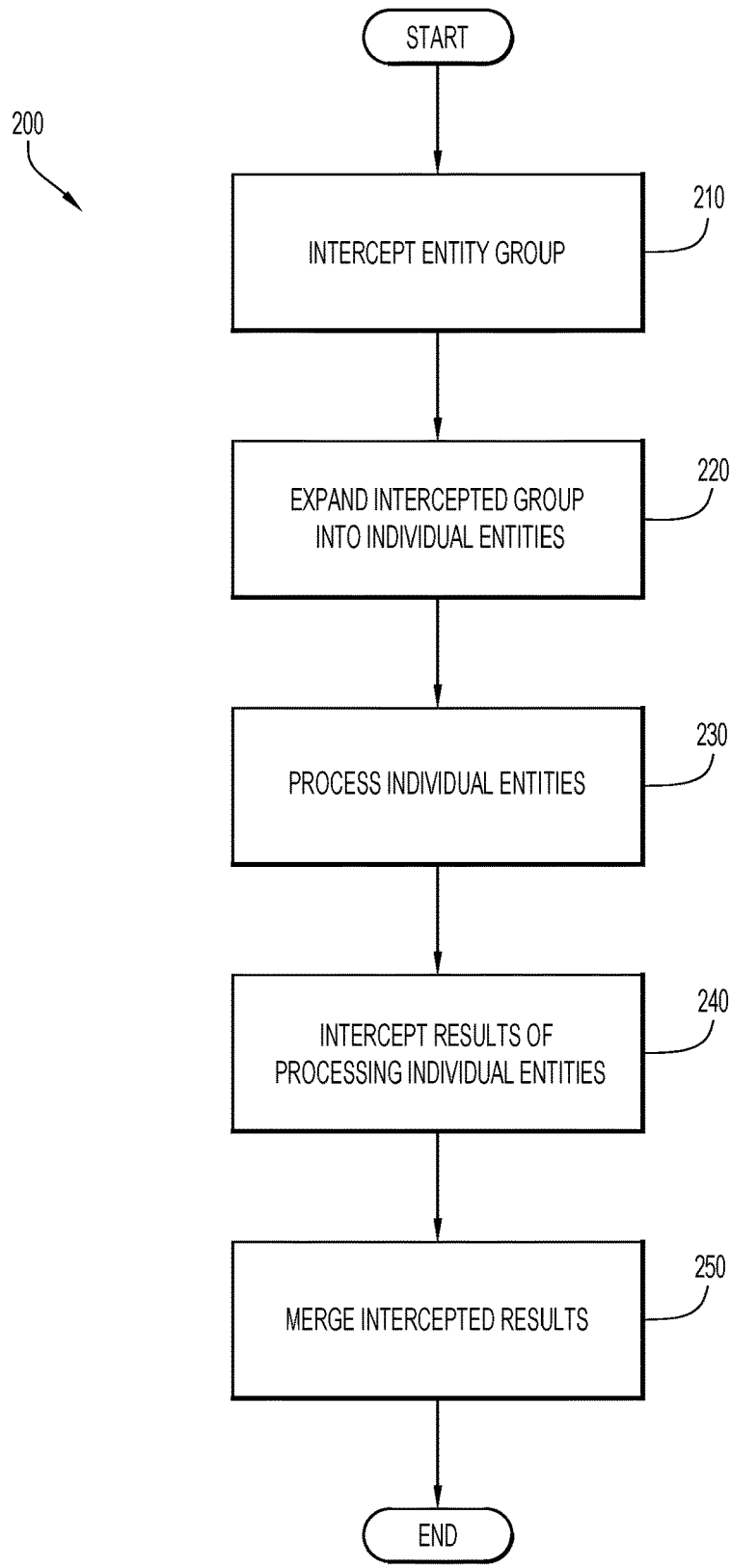
FIG. 2 is a flow chart depicting a method of processing entity groups in accordance with an embodiment of the present invention.

FIG. 2 is a flow chart depicting a method 200 of processing entity groups in accordance with an embodiment of the present invention.

An entity group is intercepted at operation 210 by grouping module 150. An entity group may be intercepted as part of a request sent to server 130 from a device such as user device 110. If a request contains a mixture of entities and entity groups, then server 130 may allow the entities to proceed to analytics engine 160 for processing, whereas the entity groups are intercepted and passed to grouping module 150.

The intercepted entity group is expanded into individual entities at operation 220. Grouping module 150 may expand an entity group by consulting entity group list 180 to determine which entities belong to the entity group. Grouping module 150 may then substitute the entity group with its constituent entities and send the entities for processing to analytics engine 160.

The individual entities are processed at operation 230. Analytics engine 160 may individually process each entity against ingested data. In some embodiments, server 130 has multiple analytics engines that each specialize in processing particular entity types, and the individual entities are sent to an analytics engine accordingly for processing in parallel. This provides faster response times for requests. Once analytics engine 160 finishes processing an entity to generate analytics, the results of the processing may be sent as a response to the request received by server 130 at operation 210.

The results of processing each individual entity are intercepted at operation 240. Grouping module 150 may intercept any results that correspond to entities belonging to an intercepted entity group before the results are sent from server 130 to user device 110.

The intercepted results are merged at operation 250. Grouping module 150 merges together the results of each entity that was produced by expanding the entity group at operation 220. Server 130 may then send the merged entity group results as a response to the request that was received at operation 210. Server 130 may send the merged entity group results back to a requesting device such as user device 110. This functionality may be added to a pre-established analytics engine that does not support processing entity groups but can process individual entities, thus speeding up the engine by not requiring modifications in order to process entity groups.

Figure 3:
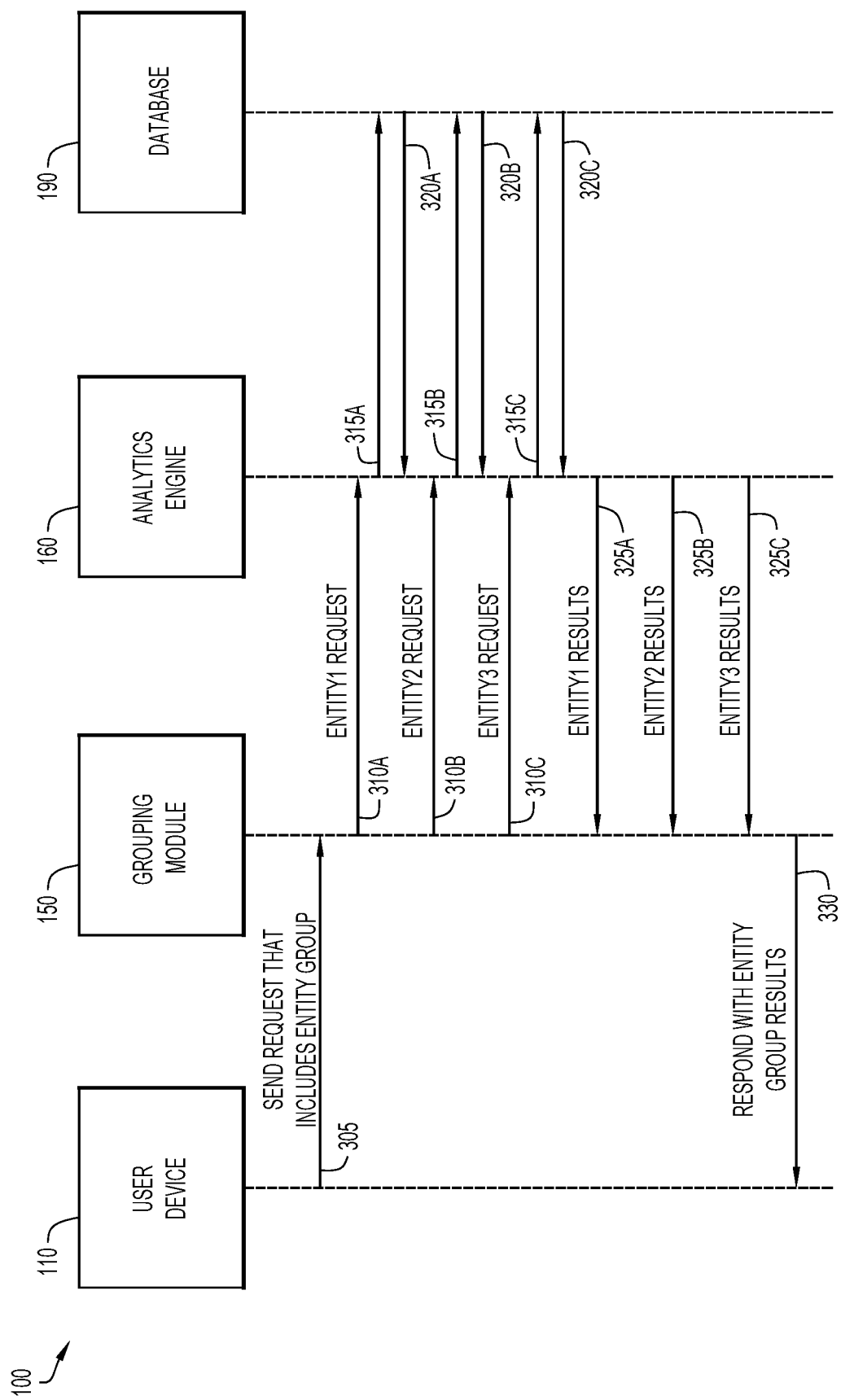
FIG. 3 is a flow diagram depicting an entity group processed in accordance with an embodiment of the present invention.

FIG. 3 is a flow diagram depicting computing environment 100 for processing an entity group in accordance with an embodiment of the present invention. As depicted, computing environment 100 includes user device 110, grouping module 140, analytics engine 160, and database 180.

Initially, a user sends a request including an entity group from a user device 110 to analytics engine 160 at flow 305. The request is intercepted by grouping module 150, which detects the entity group in the request and expands the entity group into its constituent entities according to entity group list 180. In the depicted example, the entity group has three entities, "ENTITY1," "ENTITY2," and "ENTITY3."

Once grouping module 150 expands the entity group into individual entities, grouping module 150 sends a separate request for each entity to analytics engine 160 at flows 310A-310C. When analytics engine 160 receives an entity request, analytics engine 160 begins to generate analytics based on the entity request by analyzing data in database 190 that has been ingested. Analytics engine 160 may send requests for data to database 190 at flows 315A-315C and receive response for the data requested at flows 320A-320C. While a single request flow and response flow have been depicted for the purpose of explaining the present embodiment, it is to be understood that analytics engine 160 may send multiple requests for data to database 190 and receive multiple responses from database 190 until analytics engine 160 has completed processing an entity against the ingested data.

When analytics engine 160 finishes processing an entity, analytics engine 160 sends the results back for user device 110 at flows 325A-325C. Grouping module 150 intercepts the multiple results and merges the results together to produce a single results set. Grouping module 150 sends the single results set back to user device 110 at flow 330. Thus, flow 330 can be considered a response to the request sent by user device 110 at flow 305.

FIG. 4 is a block diagram depicting components of a computer 10 suitable for executing the methods disclosed herein. Computer 10 may implement user device 110 and server 130 to process entity groups to generate analytics in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Processor(s) 14 and memory 16 may be substantially similar to processor 132 and memory 134 of FIG. 1, and persistent storage 18 may be substantially similar to database 190 of FIG. 1. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data, such as documents before or after ingestion and annotation, analytics data, entity data, and entity group data, may be stored within any conventional or other data structures (e.g., files, arrays, lists, stacks, queues, records, etc.) and may be stored in any desired storage unit (e.g., database, data or other repositories, queue, etc.). The data transmitted between user device 110 and server 130 may include any desired format and arrangement, and may include any quantity of any types of fields of any size to store the data. The definition and data model for any of the data, such as documents before or after ingestion and annotation, analytics data, entity data, and entity group data, may indicate the overall structure in any desired fashion (e.g., computer-related languages, graphical representation, listing, etc.).

Data, such as documents before or after ingestion and annotation, analytics data, entity data, and entity group data, may include any information provided by user device 110 or provided to database 190 of server 130. Data, such as documents before or after ingestion and annotation, analytics data, entity data, and entity group data, may include any desired format and arrangement, and may include any quantity of any types of fields of any size to store any desired data. The fields may indicate the presence, absence, actual values, or any other desired characteristics of the data of interest (e.g., quantity, value ranges, etc.). Data, such as documents before or after ingestion and annotation, analytics data, entity data, and entity group data, may include all or any desired portion (e.g., any quantity of specific fields) of personal information (PI) or other data of interest within a given implementation or system. Data, such as documents before or after ingestion and annotation, analytics data, entity data, and entity group data, may indicate the overall structure in any desired fashion (e.g., computer-related languages, graphical representation, listing, etc.). The fields and/or tables for the data stored in a database, such as database 190, may be selected automatically (e.g., based on metadata, common or pre-defined models or structures, etc.) or manually (e.g., pre-defined, supplied by a data owner or electronic commerce vendor, etc.) in any desired fashion for a particular implementation or system. Metadata (e.g., for annotated documents, etc.) may include any suitable information providing a description of fields or information (e.g., description of content, data type, locations of entities in documents, etc.).

The data, such as documents before or after ingestion and annotation, analytics data, entity data, and entity group data, may include any data collected about entities by any collection means, any combination of collected information, any information derived from analyzing collected information.

The present invention embodiments may employ any number of any type of user interface (e.g., Graphical User Interface (GUI), command-line, prompt, etc.) for obtaining or providing information (e.g., documents before or after ingestion and annotation, analytics data, entity data, entity group data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing embodiments for processing entity groups to generate analytics.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, annotator module 140, grouping module 150, analytics engine 160, etc.). These systems may include any types of monitors and input devices (e.g., keyboard, mouse, voice recognition, etc.) to enter and/or view information.

It is to be understood that the software (e.g., communications software, server software, annotator module 140, grouping module 150, analytics engine 160, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., communications software, server software, annotator module 140, grouping module 150, analytics engine 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., documents before or after ingestion and annotation, analytics data, entity data, and entity group data). The database system may be implemented by any number of any conventional or other databases, data stores or storage structures (e.g., files, databases, data structures, data or other repositories, etc.) to store information (e.g., documents before or after ingestion and annotation, analytics data, entity data, and entity group data). The database system may be included within or coupled to the server and/or client systems. The database systems and/or storage structures may be remote from or local to the computer or other processing systems, and may store any desired data (e.g., documents before or after ingestion and annotation, analytics data, entity data, and entity group data).

The present invention embodiments may employ any number of any type of user interface (e.g., Graphical User Interface (GUI), command-line, prompt, etc.) for obtaining or providing information (e.g., documents before or after ingestion and annotation, analytics data, entity data, and entity group data), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, in a data processing system comprising at least one processor and at least one memory, the at least one memory comprising instructions executed by the at least one processor to cause the at least one processor to process a group of inputs, the method comprising:
   intercepting a group of entities entered as input for processing against a set of ingested documents, wherein the set of ingested documents is not previously annotated for the group of entities, wherein the group of entities is distinguished from an individual entity by determining that the group of entities is included on a predefined entity group list that includes groups of entities rather than individual entities;
   expanding the intercepted group into a plurality of individual entities, wherein the intercepted group is expanded according to a list that indicates relationships between groups of entities and the individual entities for each group, and wherein the individual entities for each group of entities have one or more characteristics in common, wherein the individual entities each include a disease or gene and wherein the one or more characteristics in common includes a disease or gene characteristic;
   processing each of the individual entities to produce results for each individual entity, wherein the set of ingested documents has been annotated for one or more of the individual entities, wherein the individual entities are classified into subsets according to an entity type, wherein a particular analytics engine of a plurality of analytics engines is used to process each subset of individual entities based on the entity type, wherein the plurality of individual entities is substituted for the intercepted group of entities, and wherein each of the individual entities is provided to an analytics engine for the processing; and
   intercepting the results, from the analytics engine, for each individual entity and merging the intercepted results of each individual entity to produce results for the group of entities.

2. The method of claim 1, wherein the processing is performed by a back-end system.

3. The method of claim 2, wherein the back-end system includes the plurality of analytics engines to generate analytics for the individual entities.

4. The method of claim 3, wherein each analytics engine is not configured to process groups of entities.

5. The method of claim 1, wherein the individual entities are determined to correspond to the intercepted group using machine learning.

6. A computer system for processing a group of inputs, the computer system comprising:
   one or more computer processors;
   one or more computer readable storage media;
   program instructions stored on the one or more computer readable storage media for execution by at least one of the one or more computer processors, the program instructions comprising instructions to:
   intercept a group of entities entered as input for processing against a set of ingested documents, wherein the set of ingested documents is not previously annotated for the group of entities, wherein the group of entities is distinguished from an individual entity by determining that the group of entities is included on a predefined entity group list that includes groups of entities rather than individual entities;
   expand the intercepted group into a plurality of individual entities, wherein the intercepted group is expanded according to a list that indicates relationships between groups of entities and the individual entities for each group, and wherein the individual entities for each group of entities have one or more characteristics in common, wherein the individual entities each include a disease or gene and wherein the one or more characteristics in common includes a disease or gene characteristic;
   process each of the individual entities to produce results for each individual entity, wherein the set of ingested documents has been annotated for one or more of the individual entities, wherein the individual entities are classified into subsets according to an entity type, wherein a particular analytics engine of a plurality of analytics engine is used to process each subset of individual entities based on the entity type, wherein the plurality of individual entities is substituted for the intercepted group of entities, and wherein each of the individual entities is provided to an analytics engine for the processing; and
   intercept the results, from the analytics engine, for each individual entity and merge the intercepted results of each individual entity to produce results for the group of entities.

7. The computer system of claim 6, wherein the processing is performed by a back-end system.

8. The computer system of claim 7, wherein the back-end system includes the plurality of analytics engines to generate analytics for individual entities.

9. The computer system of claim 8, wherein each analytics engine is not configured to process groups of entities.

10. The computer system of claim 6, wherein the individual entities are determined to correspond to the intercepted group using machine learning.

11. A computer program product for processing a group of inputs, the computer program product comprising one or more computer readable storage media collectively having program instructions embodied therewith, the program instructions executable by a computer to cause the computer to:
    intercept a group of entities entered as input for processing against a set of ingested documents, wherein the set of ingested documents is not previously annotated for the group of entities, wherein the group of entities is distinguished from an individual entity by determining that the group of entities is included on a predefined entity group list that includes groups of entities rather than individual entities;
    expand the intercepted group into a plurality of individual entities, wherein the intercepted group is expanded according to a list that indicates relationships between groups of entities and the individual entities for each group, and wherein the individual entities for each group of entities have one or more characteristics in common, wherein the individual entities each include a disease or gene and wherein the one or more characteristics in common includes a disease or gene characteristic;
    process each of the individual entities to produce results for each individual entity, wherein the set of ingested documents has been annotated for one or more of the individual entities, wherein the individual entities are classified into subsets according to an entity type, wherein a particular analytics engine of a plurality of analytics engine is used to process each subset of individual entities based on the entity type, wherein the plurality of individual entities is substituted for the intercepted group of entities, and wherein each of the individual entities is provided to an analytics engine for the processing; and
    intercept the results, from the analytics engine, for each individual entity and merge the intercepted results of each individual entity to produce results for the group of entities.

12. The computer program product of claim 11, wherein the processing is performed by a back-end system.

13. The computer program product of claim 12, wherein the back-end system includes the plurality of analytics engines to generate analytics for the individual entities.

14. The computer program product of claim 13, wherein each analytics engine is not configured to process groups of entities.

15. The computer program product of claim 11, wherein the individual entities are determined to correspond to the intercepted group using machine learning.

* * * * *